(12) United States Patent
Hall

(10) Patent No.: US 9,794,855 B2
(45) Date of Patent: Oct. 17, 2017

(54) FACILITATION OF GEOGRAPHICALLY ADDRESSED DATA STREAMING

(71) Applicant: AT&T Intellectual Property I, L.P., Atlanta, GA (US)

(72) Inventor: Robert Hall, Berkeley Heights, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 206 days.

(21) Appl. No.: 14/504,110

(22) Filed: Oct. 1, 2014

(65) Prior Publication Data

US 2016/0100346 A1    Apr. 7, 2016

(51) Int. Cl.
| | |
|---|---|
| *H04W 40/22* | (2009.01) |
| *H04W 40/02* | (2009.01) |
| *H04W 40/32* | (2009.01) |
| *H04W 40/20* | (2009.01) |
| *H04L 12/741* | (2013.01) |
| *H04W 84/18* | (2009.01) |

(52) U.S. Cl.
CPC ............ *H04W 40/22* (2013.01); *H04L 45/74* (2013.01); *H04W 40/02* (2013.01); *H04W 40/20* (2013.01); *H04W 40/32* (2013.01); *H04W 84/18* (2013.01)

(58) Field of Classification Search
CPC ..... H04W 40/22; H04W 40/02; H04W 40/20; H04W 40/32; H04W 84/18; H04L 45/74
See application file for complete search history.

(56) References Cited

U.S. PATENT DOCUMENTS

| | | | |
|---|---|---|---|
| 5,754,754 A * | 5/1998 | Dudley | G06F 11/1443 714/18 |
| 5,850,396 A | 12/1998 | Gilbert | |
| 6,192,417 B1 | 2/2001 | Block et al. | |
| 7,082,131 B2 | 7/2006 | Yamauchi et al. | |
| 7,133,403 B1 | 11/2006 | Mo et al. | |
| 7,158,798 B2 | 1/2007 | Lee et al. | |
| 7,184,421 B1 * | 2/2007 | Liu | H04L 12/189 370/254 |
| 7,345,998 B2 | 3/2008 | Cregg et al. | |
| 7,403,492 B2 | 7/2008 | Zeng et al. | |
| 7,468,954 B2 | 12/2008 | Sherman | |
| 7,525,933 B1 | 4/2009 | Hall | |
| 7,813,326 B1 | 10/2010 | Kelm et al. | |
| 7,894,428 B2 | 2/2011 | Yamane | |
| 7,917,169 B1 | 3/2011 | Hall | |

(Continued)

OTHER PUBLICATIONS

Hall, "An Efficient Protocol for Geographically Addressed Streaming," AT&T Labs Research, 7 pages, Retrieved on Jul. 8, 2014.

(Continued)

*Primary Examiner* — Kwang B Yao
*Assistant Examiner* — Moo Ryong Jeong
(74) *Attorney, Agent, or Firm* — Amin, Turocy & Watson, LLP

(57) ABSTRACT

A more efficient network is facilitated by data routing. A node device within a network can broadcast a first set of data to a network of other node devices. Based on node device characteristics, some nodes will hear the broadcast first and can be labeled as a relay node. The relay nodes can then transmit other data based on the determination of other relay nodes.

20 Claims, 12 Drawing Sheets

(56) References Cited

U.S. PATENT DOCUMENTS

| | | |
|---|---|---|
| 7,969,914 B1 | 6/2011 | Gerber et al. |
| 8,036,696 B2 | 10/2011 | Hall |
| 8,059,012 B2 | 11/2011 | Bai et al. |
| 8,089,912 B2 | 1/2012 | Tsai et al. |
| 8,098,618 B2 | 1/2012 | Hundscheidt et al. |
| 8,149,801 B2 | 4/2012 | Hall |
| 8,218,463 B2 | 7/2012 | Hall |
| 8,232,898 B2 | 7/2012 | Bai et al. |
| 8,355,410 B2 | 1/2013 | Hall |
| 8,379,562 B2 | 2/2013 | Pitts |
| 8,410,956 B2 | 4/2013 | Bai et al. |
| 8,422,497 B2 | 4/2013 | Kang et al. |
| 8,457,005 B2 | 6/2013 | Brown, III et al. |
| 8,483,652 B2 | 7/2013 | Hall |
| 8,702,506 B2 | 4/2014 | Hall |
| 8,706,113 B2 | 4/2014 | Ghai et al. |
| 8,706,148 B2 | 4/2014 | Pudney et al. |
| 8,712,056 B2 | 4/2014 | Hall |
| 8,744,419 B2 | 6/2014 | Hall et al. |
| 8,751,159 B2 | 6/2014 | Hall |
| 2006/0221891 A1 | 10/2006 | Schmitz et al. |
| 2011/0105151 A1 | 5/2011 | Hall |
| 2011/0255445 A1* | 10/2011 | Johnson .............. H04W 4/006 370/255 |
| 2012/0016940 A1 | 1/2012 | Hall |
| 2012/0094770 A1 | 4/2012 | Hall |
| 2012/0108326 A1 | 5/2012 | Hall |
| 2013/0012231 A1* | 1/2013 | Hall .................. H04W 4/006 455/456.2 |
| 2013/0099941 A1 | 4/2013 | Jana et al. |
| 2013/0114597 A1 | 5/2013 | Ogisawa et al. |
| 2014/0038511 A1 | 2/2014 | Hall |
| 2015/0067033 A1* | 3/2015 | Martinsen ............. H04L 47/125 709/203 |

OTHER PUBLICATIONS

Dietzel, et al., "In-Network Aggregation for Vehicular Ad Hoc Networks," IEEE Communications Surveys and Tutorials, 2014, 24 Pages, vol. PP, Issue 99, IEEE, Retrieved on Jul. 14, 2014.

Lin, et al., "An Efficient Automatic Repeat Request Mechanism for Wireless Multihop Relay Networks," IEEE Transactions on Vehicular Technology, Jul. 2013, pp. 2830-2839, vol. 62, Issue 6, IEEE, Retrieved on Jul. 14, 2014.

Zorzi, et al., "Geographic Random Forwarding (GeRaF) for Ad Hoc and Sensor Networks: Multihop Performance," IEEE Transactions on Mobile Computing, Oct.-Dec. 2003, pp. 337-348, vol. 2, Issue 4, IEEE, Retrieved on Jul. 14, 2014.

Almasaeid, "Data Delivery in Fragmented Wireless Sensor Networks Using Mobile Agents," 2007, 96 Pages, Iowa, Retrieved on Jul. 14, 2014.

Zhu, "Social-based Data Routing Strategies in Delay Tolerant Networks," 2014, 123 Pages, Shandong, China, Retrieved on Jul. 14, 2014.

* cited by examiner

FACILITATION OF GEOGRAPHICALLY ADDRESSED DATA STREAMING

TECHNICAL FIELD

This disclosure relates generally to facilitating geographically addressed streaming of data feeds to devices at specified geographic locations.

BACKGROUND

Scalable field data communications can increase the effectiveness and efficiency of military units, firefighters, and emergency response teams. For example, a real time common operating picture can increase peer coordination, enable command and control, and help ensure maneuvers are carried out as planned. Scalable messaging and file transfer can provide timely intelligence data, such as images and other files, to all in an area of operation. The aforementioned applications can be built from a scalable ad hoc geocast protocol (SAGP) where network messages are addressed by the physical location of their destination areas, avoiding the need for building and maintaining internet protocol (IP) routing information in highly dynamic mobile networks.

The above-described background relating to scalable field data communications is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
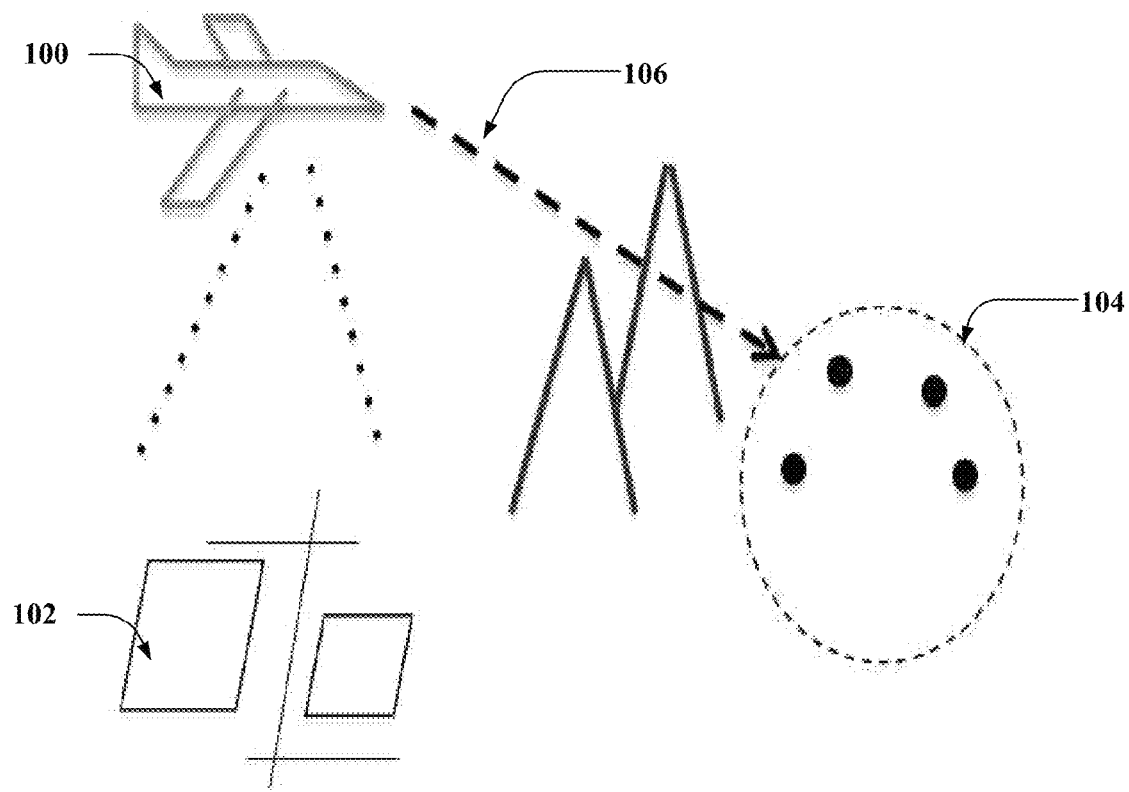
FIG. 1 illustrates an aerial vehicle streaming data to a nearby geographic location.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview of the various embodiments presented herein, to correct for the above identified deficiencies and other drawbacks of public wireless networks, various embodiments are described herein to facilitate the use of public wireless networks in a secure means.

For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a computer readable storage medium) to facilitate transporting and transferring such methodologies to computers. The term article of manufacture, as used herein, is intended to encompass a computer program accessible from any computer-readable device, carrier, or media, including a non-transitory computer readable storage medium.

A third class of critical field applications can also be built on top of geographic addressing: geographic streaming applications. A stream protocol can be used to increase efficiency of large file transfers, thereby enabling distribution of content to edge caches. Streaming is the delivery of a sequence of data packets generated by a source node to all nodes within the geographically addressed destination area. A characteristic of streaming is that even though nodes may move around and network topology may change over time, long subsequences of packets within a data stream can all go to the same destination, and the same sequence of relays can get them there. One quality metric for streaming is the packet loss rate: the fraction of stream packets that do not reach their destination. Streaming applications can tolerate some level of packet loss, with performance degrading as packet loss increases. However, a common goal of streaming applications is to deliver data streams to all nodes in an area while minimizing packet loss.

Described herein are systems, methods, articles of manufacture, and other embodiments or implementations that can facilitate usage of an SAGP. Facilitating use of an SAGP can be implemented in connection with any type of device with a connection to a communications network (a wireless communications network, the Internet, or the like), such as a mobile handset, a computer, a handheld device, or the like.

SAGP implements geographic addressing within a broadcast-based wireless network without using IP routing. A sender can address a packet by specifying a geographic location, known as a geocast region in a geocast header. The SAGP can use one-to-many broadcasts and is a selective retransmission relaying protocol. After the sender broadcasts the packet, all of the devices (nodes) receiving the transmission queue it for possible retransmission at a selected backoff delay. As the packet is waiting in the device's retransmission queue, it can hear other device transmit the same packet. Whenever it hears another transmission, it can record statistics about the transmission in the geocast record corresponding to the geocast. The statistics can include a count of how many copies have been heard, the minimum distance of all senders from the node, and the minimum distance from a sender to the center of the geocast region (CGR). When the packet's delay has expired, the node can use heuristics to decide whether to retransmit or simply discard the packet. Heuristics can be based upon the recorded statistics in the geocast record, and the node can retransmit if at least one such heuristic is satisfied. The M heuristic is true if fewer than M copies of the packet have been heard; the T heuristic is true if the minimum distance of all senders from this node is greater than T, the CD (center distance) heuristic is true if the minimum distance from any sender to the CGR is greater than the current distance from the node to the CGR. Retransmissions can proceed until all devices hearing at least one copy of the packet have made their decisions. However, geocasts also have an age limit, meaning that after L seconds beyond their origination time the geocast record can be purged and the geocast can no longer be retransmitted.

Geographic streaming can be implemented by geocasting each stream chunk using SAGP. In general, this is wasteful, because each geocast performs its own discovery of the same route. However, it is possible to save costs for streaming packets, thereby allowing a much higher stream rate before saturating the medium.

To send a second or closely succeeding (in time) packet after a geocast packet, one need not re-discover the correct sequence of retransmissions by using the full redundancy of SAGP. The challenges are (a) how to select the subset of nodes that retransmitted the first time as the ones to retransmit the additional packets, and (b) how to cache this information in the network so it can be used repeatedly for a temporal sequence of additional packets.

The normal SAGP propagation algorithm can be enhanced to record for each geocast a set of relays that forms a spanning tree of all nodes who heard the geocast. An SAGP relay for geocast G is a node which (a) transmitted during the SAGP transmission of G, and (b) was the first transmitter to be heard by at least one other node that received G. A followcast of G is a new packet that is propagated through the network by having all and only the relays of G transmit it. By definition, the originator of G is always a relay.

In order to record followcast state information, the geocast record of G at node N can be augmented to have three new fields. The MyRelay integer field can hold the node identifier (NodeID) of the node who N first heard transmit G. This is initialized at the time the geocast record for G is created, which is when the first copy can be heard. Since each geocast packet transmission contains the NodeID of its sender, this information can be copied to the MyRelay field.

The IDidRelay boolean field can be set to true if and only if N is informed that at least one node heard it first, making it a relay. This is initialized to false at record creation time and can be set to true during geocast propagation.

The HHATMR boolean field (acronym for "have heard acknowledgement to my relay") is true if N either retransmits the packet or hears another node transmit the packet advertising the same relay node as N has recorded as its relay. This is initialized to false and set to true when one of those two events occurs.

Given these changes in the geocast record, another enhancement to SAGP is the addition of a new heuristic to SAGP's existing set. The new heuristic is called the HHATMR Heuristic: it is true if at retransmit-decision time N's HHATMR field for G is false. That is, if N has not heard any other node advertise N's relay, it will retransmit, thereby guaranteeing that the relay will be informed of its relay status.

Finally, the geocast packet header is augmented to contain an additional integer field, MyRelayID, which holds the NodeID of the relay of the sending node. The originator of G will put its own NodeID into this field. A corollary of this is that the HHATMR Heuristic will never cause a node to retransmit if that node hears the packet direct from the originator, which is an efficiency win for geocasts to densely populated areas containing the originator.

A followcast packet is similar in form and content to a geocast packet. In particular, the payloads are identical and are processed the same way. In fact, the application layer receiving the packets cannot generally tell whether the packet arrived via geocast or followcast without explicitly calling a special Application Program Interface (API) function. However, while the header of a followcast contains all the same field types (with the same meanings) as a geocast, it also contains two other fields.

The OriginIDToFollow integer field holds the NodeID of the originator of the geocast being followed. The SNToFollow integer field holds the serial number of the geocast (which is assigned at origination time by the originator) being followed. These two fields allow the recipient of a followcast to locate the correct geocast record to use in further followcast processing. A followcast can have a geocast region address, which may be different from the geocast region of the original geocast. This will not affect which nodes retransmit, but may affect which nodes will actually receive and process the message at the application layer.

When a node receives a followcast transmission the first time, it looks up the geocast record for the corresponding geocast, based on the OriginIDToFollo and SNToFollow fields, as described above. If the geocast record is found, the IDidRelay field is checked and, if true, then a copy of the followcast is immediately re-transmitted. If the node is within the geocast region defined in the followcast packet, the packet is handed up to the application layer for normal geocast-style processing as well. If no geocast record is found, then first a geocast record is created, with the IDidRelay field set to false, and the followcast is not retransmitted. However, if the node is within the geocast region, then it is processed by the application layer as above. Note that this new record is also subject to the aging as in SAGP, but is allocated a new period in order to avoid the node continually re-processing old packets.

The SAGP geocast subsystem provides a simple mechanism that can be used for congestion control. Whenever the source node's geocast layer receives a copy of one of its packets sent by another, it can determine the time difference between the arrival of the copy and the origination time of the packet (which is in the header). When this exceeds a threshold, the application layer is notified and can pause or slow the rate of injecting new stream chunks. Given a cross-layer sensing capability, this can be extended to work also when the sender determines its own output queue delay exceeds the threshold as well.

The normal use of the followcast API is for an originator of a stream to call it repeatedly with each successive chunk of the stream in order. However, there are other efficacious ways to use it. For example, since there is nothing enforcing an ordering to followcast retransmissions, nodes other than the geocast originator can originate followcasts of the original geocast. In particular, a recipient of the original geocast can send a followcast that traverses the path in reverse to reach the originator of the geocast. This provides an efficient way to reply to a geocast query. For example, a controller onboard a unmanned aerial vehicle (UAV) could geocast a query to a sensor network it is flying over and followcast-enabled sensors could followcast the query geocast to reply. These replies would use fewer transmissions than would geocasting from the sensor back to the controller.

Any node who heard the original geocast may originate a followcast. This could be a message to the entire group (if the geocast region covers them all) or a particular smaller area. It could be used to implement one-to-one addressing by setting the geocast region large but encrypting the payload in the key of a single recipient.

The followcasts are subject to the geocast age limit. This means that applications must refresh periodically, by sending a new geocast, in order to be able to continue followcasting.

In simple geographic streaming (SGS) the source of the stream breaks up the stream into packet-sized chunks and numbers them so that the recipients can recognize the correct order. It then proceeds to send the chunks in order using the algorithm below:

```
PROCEDURE SGSSource(Stream S, GeocastRegion GR)
    SN := 0, Chnk := 0, LastGCTime := -∞ ■
    WHILE ((ChData := S.nextChunk( )) != null) DO
        IF ((Now( ) - LastGCTime) > kSHELF_LIFE) THEN
            SN := Geocast("[P]" to GR) ■
            LastGCTime := Now( )
        FI ■
        Followcast(Chnk+ChData to GR, following SN)
        Chnk := Chnk + 1 ■
        WAIT kSTREAM_WAIT milliseconds
        □   IF (CongestionHasBeenSensed( )) THEN
                WAIT CongestionControlWaitAmount( )
    OD
```

The algorithm is governed by two parameters. kSHELF_LIFE is the length of time to continue following a particular geocast. This parameter represents a tradeoff. A smaller value means the paths will be rediscovered more often, which is useful when nodes are moving rapidly. But it also represents more overhead and reduced efficiency. A larger value means less bandwidth is spent on the path geocasts. The other parameter is kSTREAM_WAIT, which is the period of time to wait between chunks. This controls the stream rate, which is the rate at which data is offered to the network. Packet loss generally increases with stream rate, especially when the network contains many relays.

The algorithm operates by iteratively obtaining and followcasting stream chunks, waiting in between. It sends a new path geocast each time the kSHELF_LIFE interval passes. If notified of congestion, it lengthens the wait an amount based on the sensed queue backup. The simplest SGS stream recipient simply processes each chunk as it comes, discarding chunks received out of order. A more complex recipient might buffer incoming chunks so that some reordering can be accommodated without loss.

The Geocast File Transfer (GFT) protocol provides a reliable file transfer method that geocasts all file chunks. It then uses geocasts to implement requests for re-sends of missing packets and further geocasts to send these chunks. GFT is far more scalable than unicast file transfer to all nodes in the area.

Streaming Geographic File Transfer (SGFT) further increases efficiency by replacing geocasts with followcasts. Instead of initially geocasting all file chunks in order, SGFT uses SGS to stream the chunks via followcast. Next, recipient nodes followcast their re-send requests back to the sender instead of geocasting them back. Once SGFT collects and pools the requests, it again uses SGFT to stream the re-sends in order. As this is built on SGS, its robustness and speed are controlled by the same two parameters. SGFT uses the same control heuristics as GFT to govern how many request/re-send rounds are used.

In networks having many relays, a hidden node problem (HNP) (where two out-of-contact nodes on opposite sides of a third node transmit at the same time, causing that node to miss both transmissions) is exacerbated and causes increased packet loss. Losing a path geocast could mean the loss of all followcasts as well. To deal with this problem SAGP heuristic settings can be adjusted to increase geocast redundancy and reduce the likelihood of loss. Since geocasts make up only a negligible fraction of all stream traffic, this increase is not noticeable in limiting bandwidth use, but greatly improves robustness.

Double streaming can be used to reduce the loss of followcasts due to the HNP. In this variation, the source node of the stream simply sends each stream chunk twice, numbered identically. Since the HNP typically acts probabilistically, this effectively squares the HNP loss probability. The tradeoff here is to cut the effective stream rate in half. In scenarios where the HNP will not be significant (e.g. when streaming across only one hop), the streaming can be switched back to single streaming and thereby double the rate.

In one embodiment, described herein is a method comprising a subset of node devices that have transmitted a first set of packets can be determined. Data representing the subset of node devices can then be cached so that the subset of nodes can be selected for sending a second set of packets. Each packet from the first set of packets can comprise node identification data of a previous node device. Furthermore, a node device of the subset of node devices can transmit a packet of the first set of packets in response to a condition being determined to have been satisfied.

According to another embodiment, a system can facilitate the determining of a relay path based on a subset of node devices, of a set of node devices, which have transmitted a first set of packets. The system can also facilitate caching of data representing the relay path of the first set of packets and selecting the relay path of the first set of packets based on the data representing the relay path of the first set of packets. In addition, the system can facilitate sending, via the relay path, a second set of packets via the subset of node devices that have transmitted the first set of packets. Furthermore, the system can facilitate the sending of the second set of packets in response to a time condition being determined to have been satisfied, and wherein the time condition is associated with a node device of the subset of node devices associated with a transmission of the second set of packets.

According to yet another embodiment, described herein is a computer readable medium that can perform the operations comprising determining a relay path comprising a relay path order based on a subset of node devices, of a set of node devices, that have transmitted a first set of packets from a source node device to a destination node device. The computer readable medium can also perform the operations comprising caching data representing the relay path of the first set of packets and selecting the relay path of the first set of packets based on the data representing the relay path of the first set of packets. Additionally, the computer readable medium can perform the operations comprising initiating sending, via the relay path, a second set of packets via the subset of node devices from the source node device to the destination node device; and initiating sending, via a reverse relay path comprising a path order that is reverse from the relay path order, a third set of packets. Furthermore, the computer readable medium can perform operations comprising the source node device determining a propagation time for the first set of packets.

These and other embodiments or implementations are described in more detail below with reference to the drawings.

Referring now to FIG. 1, illustrated is an aerial vehicle 100 that can stream data 106 to a nearby geographic location 104. Data can be streamed and received from any type of mobile device. The aerial vehicle 100 can communicate with other mobile device via live stream data 106 representative of a view of a location 102. Devices within the geographic location 104 can receive stream data from the aerial vehicle 100 in real-time.

Figure 2:
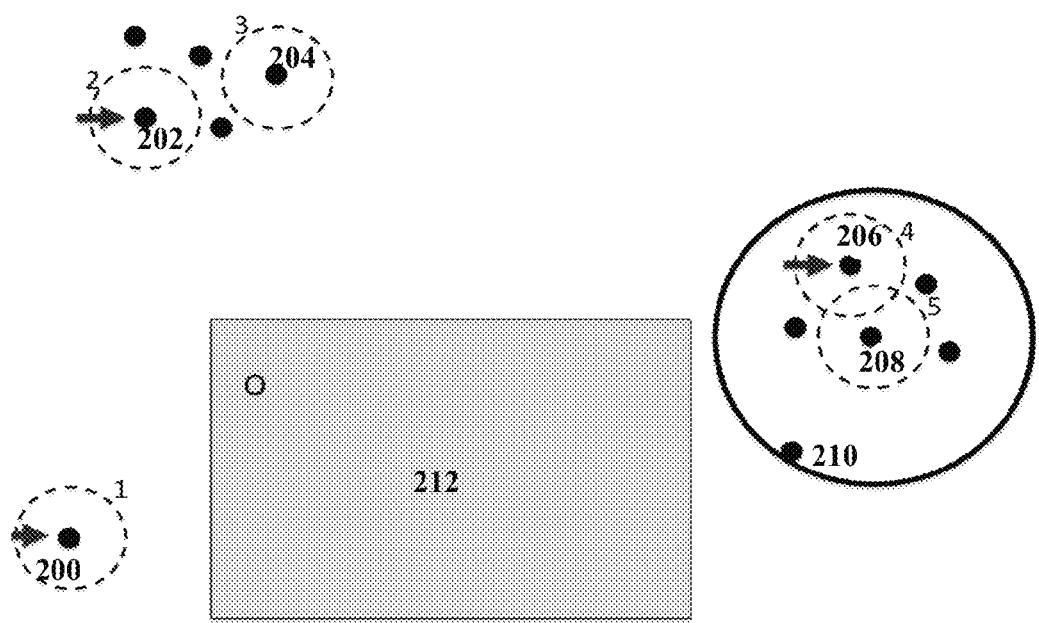
FIG. 2 illustrates a scalable ad hoc geocast transfer propagation.

Referring now to FIG. 2, illustrated is a scalable ad hoc geocast transfer propagation. An originating node 200 can send transmission 1, which is then heard by nodes near node 202 and node 204. An M heuristic can be true if fewer than M copies of the packet have been heard. Since the M heuristic is satisfied in FIG. 2, node 202 sends transmission 2. Node 204 decides next and happens to be closer to the CGR than node 202 or node 200 is, so node 204 sends transmission 3. The T heuristic can be true if the minimum distance of all senders from this node is greater than T and the CD heuristic can be true if the minimum distance from any sender to the CGR is greater than the current distance from the node to the CGR. Next, node 206 sends transmission 4 due to the T heuristic being satisfied, and node 208 then sends transmission 5 due to the CD heuristic being satisfied. Node 210 can only receive transmissions 4 and 5, due to a blocked line of sight from nodes 202 and 204. The retransmission proceeds until all devices hearing at least one copy of the packet have made their decisions. For all other nodes, no heuristic was satisfied when its decision time occurred, so no other transmissions occur. Since only 5 out of 11 nodes transmitted, SAGP is more efficient than simple flooding, which would have caused all 11 nodes to transmit.

Relays are represented by with arrows within FIG. 2. Node 200 can be a relay because it was the one whose transmission was first heard by nodes 202 and 204 and the nodes near them. Node 202 can also be a relay because it is the first one to be heard by nodes 206 and 208 and the nodes near them. Node 206 can also be a relay because it is the first transmitter heard by node 210. In this example, no other nodes are relays, because even though they may have transmitted, they were not the first to be heard by any other node. Thus, followcasts that follow the geocast shown in FIG. 2 can result in only three transmissions total (those by nodes 200, 202, and 206), which is fewer than the original geocast (five in this example).

Figure 3:
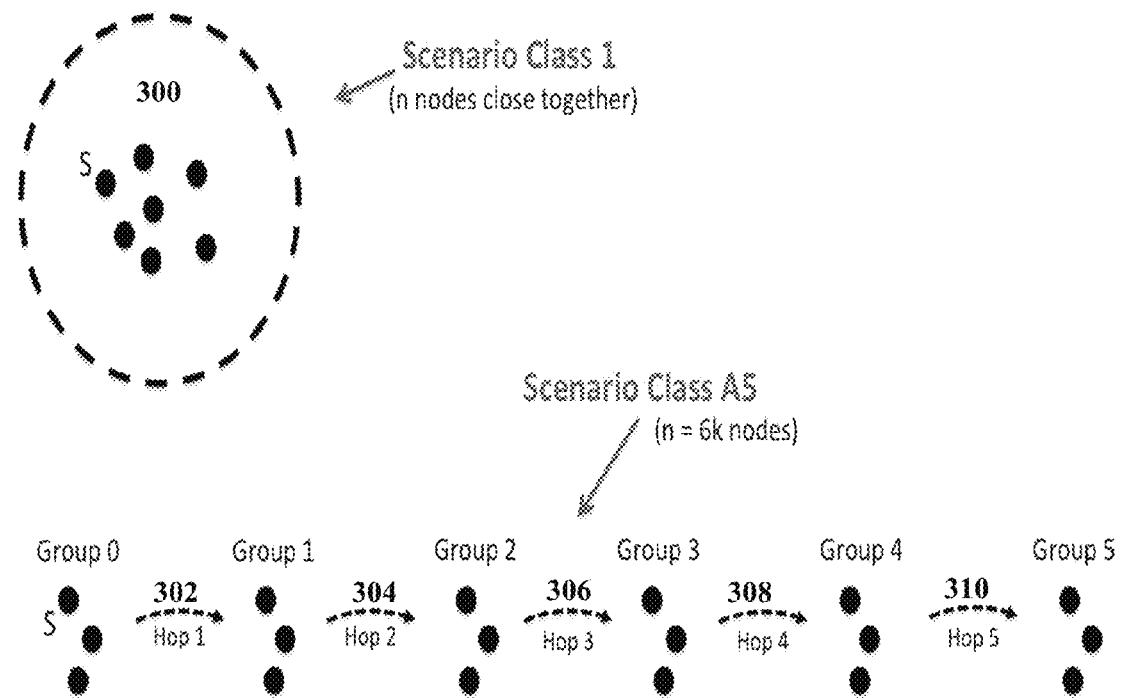
FIG. 3 illustrates a network of node devices and streaming in relation to node device locations.

Referring now to FIG. 3, illustrated is a network of node devices and streaming in relation to node device locations. Scenario Class 1 can position n nodes 300 all close together so that each node hears all others. The Scenario Class 1 configuration can run either SGS or SGFT, with the geocast region set large enough to include all devices.

Scenario Class A5 (five hops: 302, 304, 306, 308, 310) can position six groups of k nodes each in a line such that each device in group i can hear only other nodes in group i and all nodes in groups i−1 and i+1 and no others. The source node, S, (for SGS or SGFT) can be in group 0, the leftmost. Here, n=6k. The addressed region can be a circle encompassing all nodes. Scenario Class M5 is a combination of Scenario Class 1 and Scenario Class A5 comprising a mobility scenario, where nodes can start in the positions they have in Scenario Class 1 and move a constant speed to their positions in Scenario Class A5. Thus, again, n=6k, but the network starts out completely connected (one-hop) and ends as a linear network (five-hop: 302, 304, 306, 308, 310). The fastest nodes can move at 1.85 m/sec and the streaming can occur throughout the scenario. Each scenario class presents its own challenges. The challenge in Scenario Class 1 is to see how fast streaming can be pushed. Scenario Class A5 type scenarios can maximize the HNP and can challenge the robustness of followcast. Scenario Class M5 introduces movement, which can cause changes in the network topology and concomitant path breakages.

Figure 4:
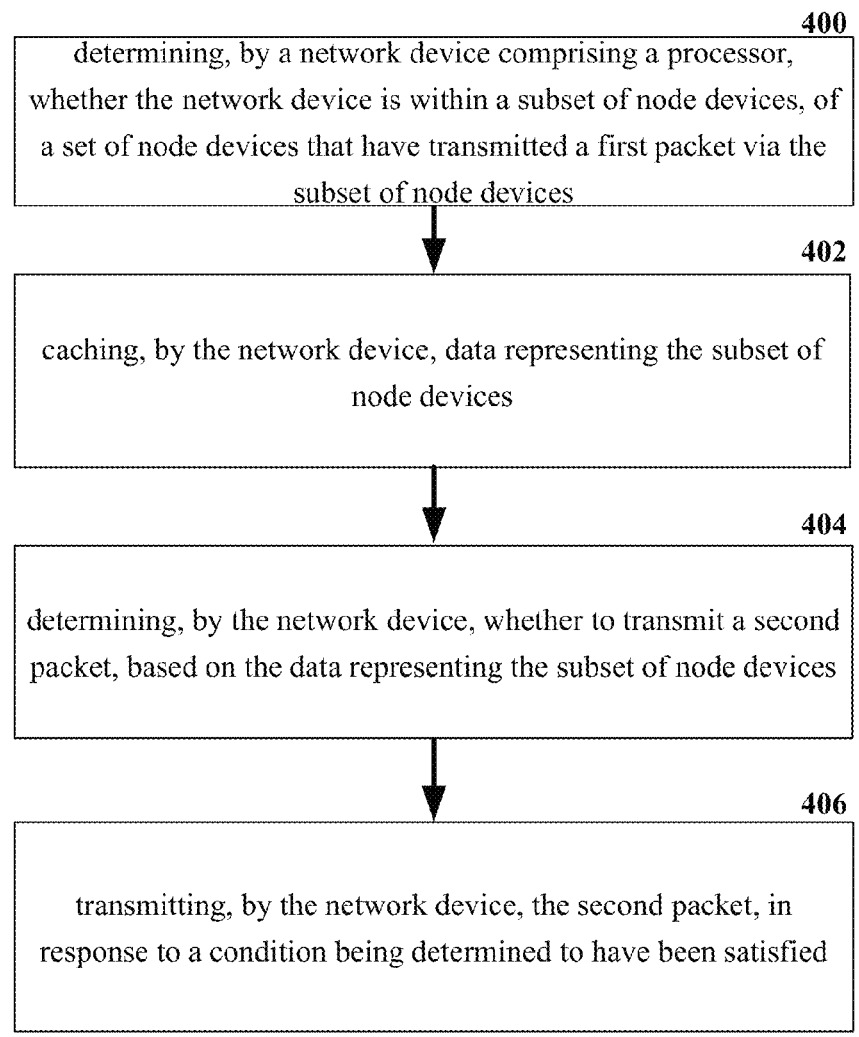
FIG. 4 illustrates a schematic system block diagram of a subset of node devices for transmitting packet data in a network.

Referring now to FIG. 4, illustrated is a schematic system block diagram of a subset of node devices for transmitting packet data in a network. At element 400 a subset of node devices are determined, from a set of node devices that have transmitted a packet via the set of node devices. An originator node can transmit a packet that can be heard by other nodes during a geocast. A node whose transmission is heard first by other nodes is considered a relay node. The subset of node devices described at element 400 can comprise the relay nodes. At element 402, data representing the subset of node devices can then be cached so that the subset of node devices, that have transmitted the first packet based on the data representing the subset of node devices, can be selected at element 404 for sending a second packet via the subset of node devices at element 404.

An SAGP geocast record can include, but is not limited to, fields such as: MyRelay, IDidRelay, HHATMR, OriginID-ToFollow, SNToFollow. These fields allow for records to be stored or cached. The stored or cached records can correspond to nodes and their identities. At element 402, the cached data can be representative of node device identification of the subset of node devices that correspond to the subset of node devices (relay nodes). The cached data can also contain packet data, comprising node identification data of a previous node device. The previous node device can be any node device, which has transmitted data to another node device, respective to the other node device. The identified relay nodes can then be selected again at element 404 for a transmission of a second packet at element 406.

Figure 5:
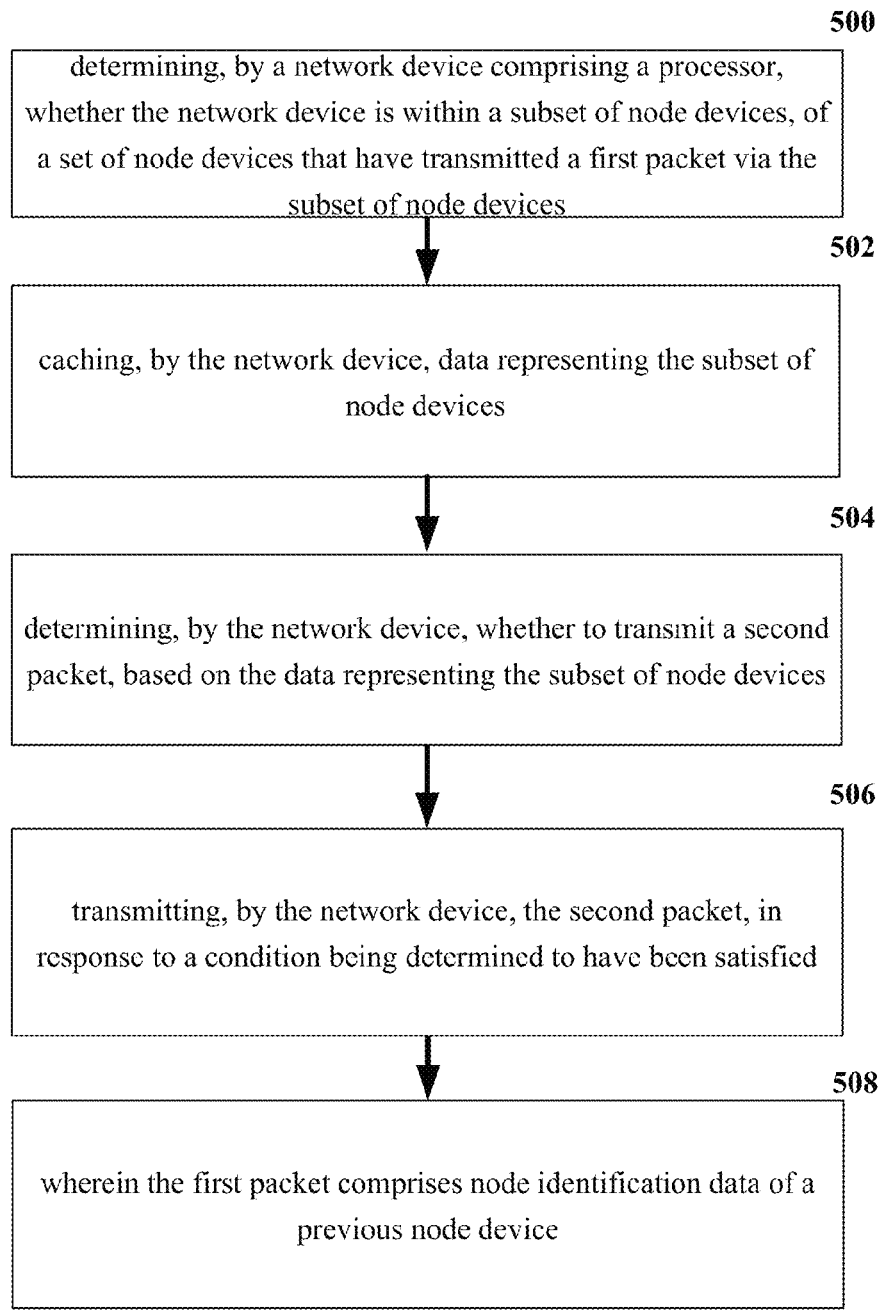
FIG. 5 illustrates a schematic system block diagram of a subset of node devices for transmitting packet data, comprising node identification data, in a network.

Referring now to FIG. 5, illustrated is a schematic system block diagram of a subset of node devices for transmitting packet data, comprising node identification data, in a network. At element 500 a subset of node devices are determined, from a set of node devices that have transmitted a first packet via the set of node devices. An originator node can transmit packets that can be heard by other nodes during a geocast. A node whose transmission is heard first by other nodes is considered a relay node. The subset of node devices described at element 500 can comprise the relay nodes. At element 502, data representing the subset of node devices can then be cached so that the subset of node devices, that have transmitted the first packet based on the data representing the subset of node devices, can be selected at element 504 for transmitting a second packet via the subset of node devices at element 504.

An SAGP geocast record can include, but is not limited to, fields such as: MyRelay, IDidRelay, HHATMR, OriginID-ToFollow, SNToFollow. These fields allow for records to be stored or cached. The stored or cached records can correspond to nodes and their identities. At element 502, the cached data can be representative of node device identification of the subset of node devices that correspond to the subset of node devices (relay nodes). The identified relay nodes can then be selected again at element 504 for a transmission of a second packet at element 506.

Each packet can comprise node identification data of a previous node device at element 508. Cached node identification data associated with the first packet allows the system to determine which nodes are relay nodes based on which nodes were heard first. Whenever the nodes hear a transmission, they can record statistics about the transmission in the geocast record corresponding to the geocast. The statistics can include a count of how many copies have been heard, the minimum distance of all senders from the node, and the minimum distance from a sender to the CGR. The node identification data also allows each node to determine the proper transmission path for a followcast based on the cached node identification data.

Figure 6:
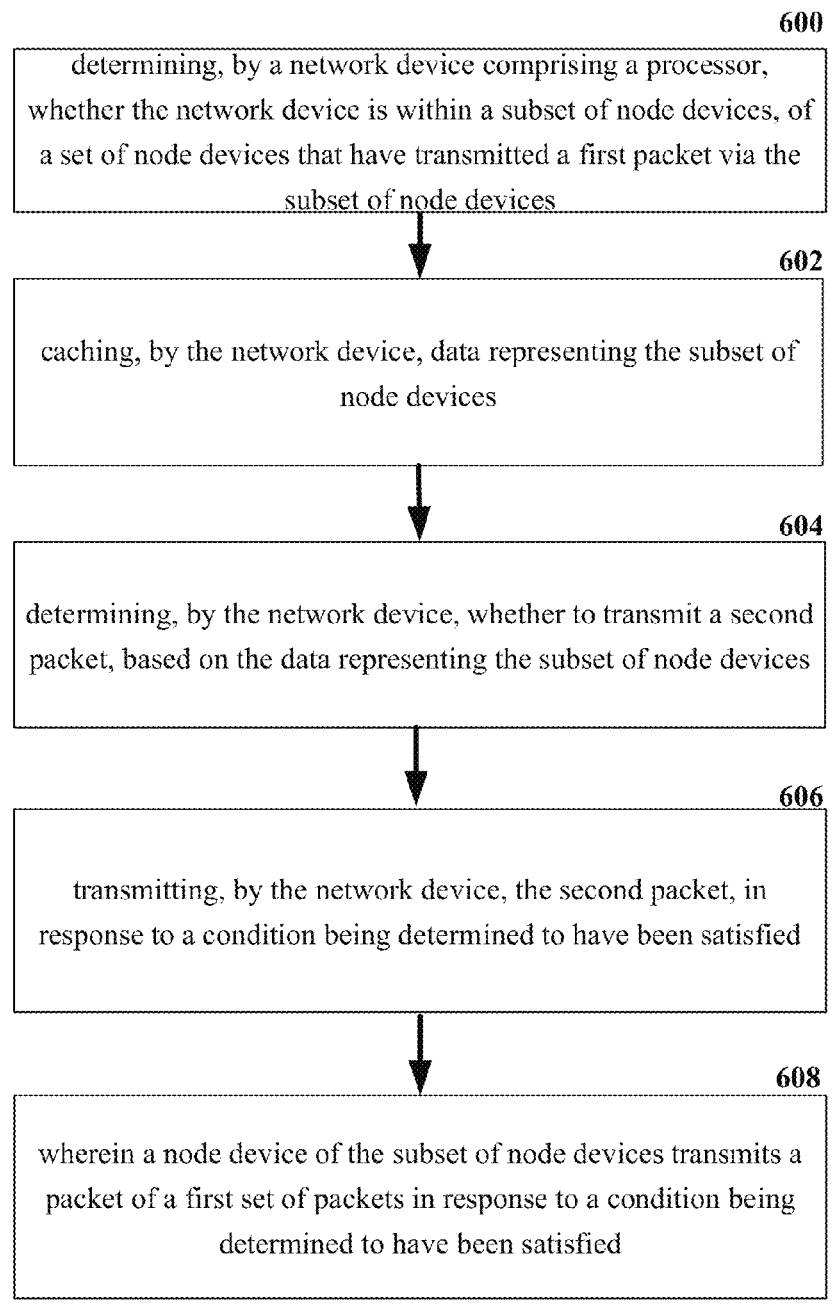
FIG. 6 illustrates a schematic system block diagram of a subset of node devices for transmitting packet data in a network in response to satisfying a condition.

Referring now to FIG. 6, illustrated is a schematic system block diagram of a subset of node devices for transmitting packet data in a network in response to satisfying a condition. At element 600 a subset of node devices are determined, from a set of nodes devices that have transmitted a first packet via the set of node devices. An originator node can transmit packets that can be heard by other nodes during a geocast. A node whose transmission is heard first by other nodes is considered a relay node. The subset of node devices described at element 600 comprise the relay nodes. At element 602, data representing the subset of node devices can then be cached so that the subset of node devices, that have transmitted the first packet based on the data representing the subset of node devices, can be selected at element 604 for sending a second packet via the subset of node devices at element 606.

An SAGP geocast record can include, but is not limited to, fields such as: MyRelay, IDidRelay, HHATMR, OriginID-ToFollow, SNToFollow. These fields allow for records to be stored or cached. The stored or cached records can correspond to nodes and their identities. At element 602, the cached data can be representative of node device identification of the subset of node devices that correspond to the subset of node devices (relay nodes). The identified relay nodes can then be selected again at element 604 for a transmission of a second set of packets at element 606.

Cached node identification data associated with each packet can allow the system to determine which nodes are relay nodes based on which nodes were heard first. Whenever the nodes hear a transmission, they can record statistics about the transmission in the geocast record corresponding to the geocast. The statistics can include a count of how many copies have been heard, the minimum distance of all senders from the node, and the minimum distance from a sender to the CGR. The node identification data also allows each node to determine the proper transmission path for a followcast based on the cached node identification data.

At element 608, a node device of the subset of node devices can transmit a first packets in response to a condition being determined to have been satisfied. Conditions relating to the node device transmissions can be based on heuristics. Heuristics can be based upon the recorded statistics in the geocast record, and nodes can retransmits if at least one such heuristic is satisfied. The M heuristic is true if fewer than M copies of the packet have been heard; the T heuristic is true if the minimum distance of all senders from this node is greater than T, the CD (center distance) heuristic is true if the minimum distance from any sender to the CGR is greater than the current distance from the node to the CGR. Retransmissions can proceed until all devices hearing at least one copy of the packet have made their decisions. However, geocasts also have an age limit, meaning that after L seconds beyond their origination time the geocast record can be purged and the geocast can no longer be retransmitted.

Figure 7:
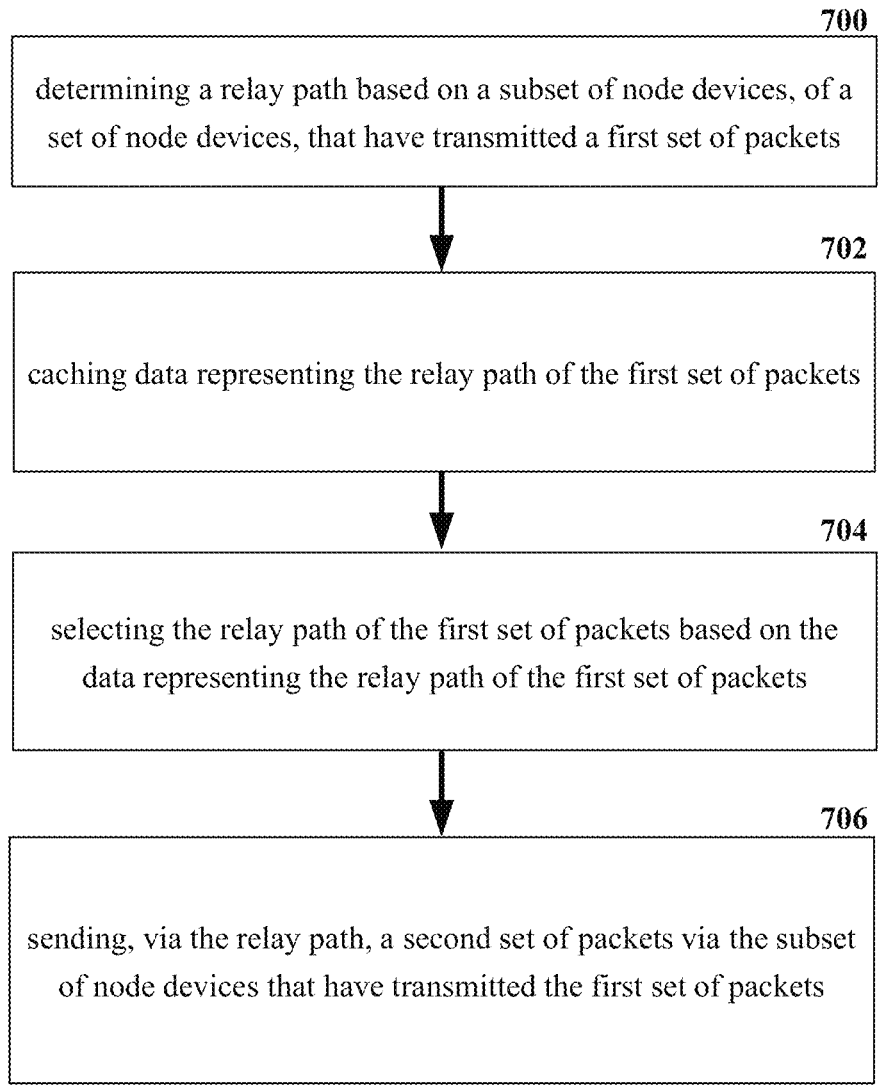
FIG. 7 illustrates a schematic system block diagram for determining a relay path based on a subset of node devices and sending a second set of packets via the subset of node devices.

Referring now to FIG. 7, illustrated is a schematic system block diagram for determining a relay path based on a subset of node devices and sending a second set of packets via the subset of node devices. At element 700 a system can facilitate, the determining of a relay path based on a subset of node devices, of a set of node devices, that have transmitted a first set of packets. An originator node can transmit packets that can be heard by other nodes during a geocast. A node whose transmission is heard first by other nodes is considered a relay node. The relay path is comprised of the subset of node devices at element 700.

The system can also facilitate, at element 702, caching of data representing the relay path of the first set of packets and selecting the relay path of the first set of packets based on the data representing the relay path of the first set of packets. Cached node identification data associated with each packet from the first set of packets allows the system to determine which nodes are relay nodes based on which nodes were heard first. Whenever the nodes hear a transmission, they can record statistics about the transmission in the geocast record corresponding to the geocast. The statistics can include a count of how many copies have been heard, the minimum distance of all senders from the node, and the minimum distance from a sender to the CGR. The node identification data also allows each node to determine the proper transmission path for a followcast based on the cached node identification data. An SAGP geocast record can include, but is not limited to, fields such as: MyRelay, IDidRelay, HHATMR, OriginIDToFollow, SNToFollow. These fields allow for records to be stored or cached. The stored or cached records can correspond to nodes and their identities. At element 702, the cached data can be representative of the relay path of the first set of packets. The identified relay paths can then be selected again at element 704 for a transmission, via the relay path, of a second set of packets at element 706.

Figure 8:
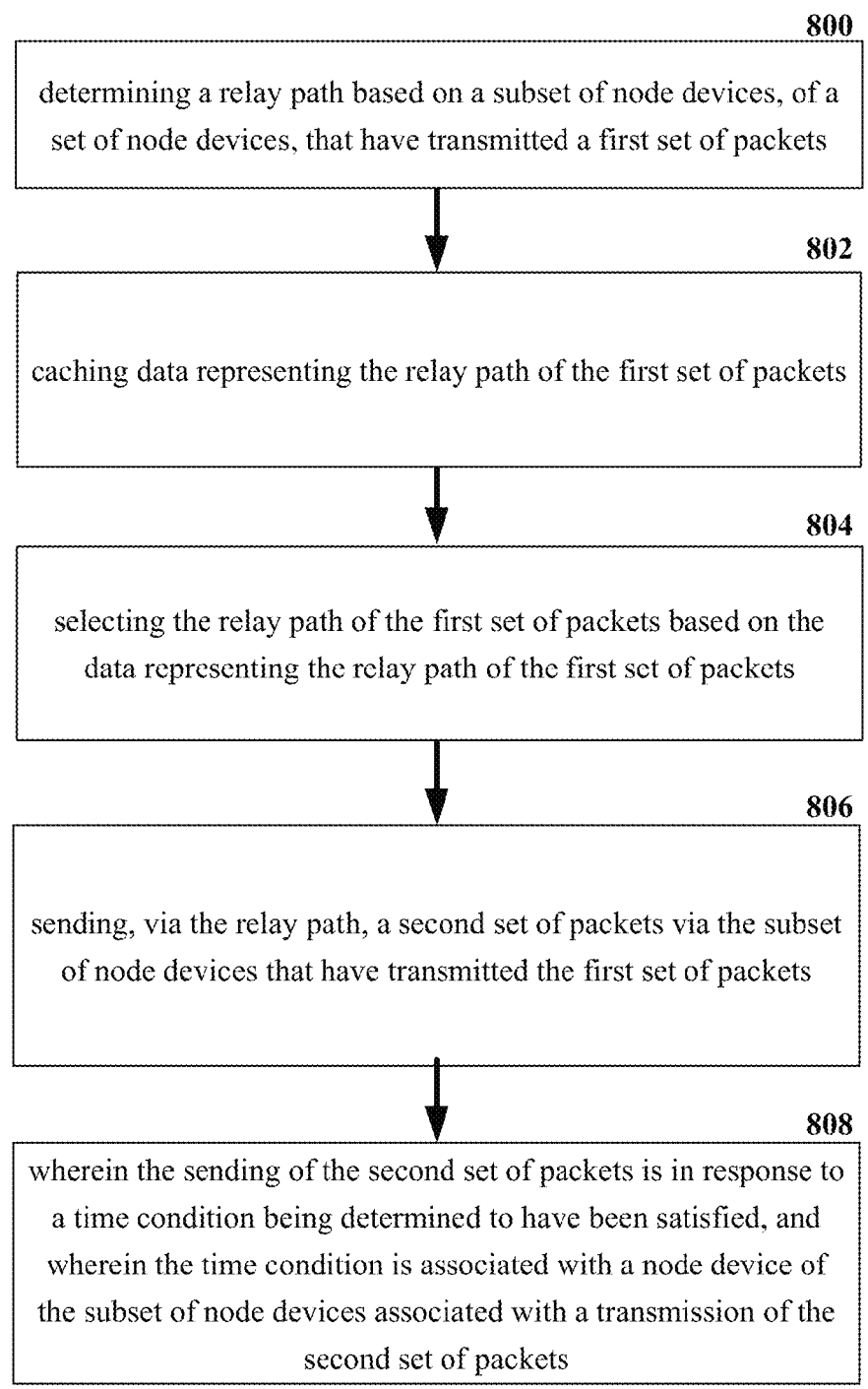
FIG. 8 illustrates a schematic system block diagram for determining a relay path based on a subset of node devices and sending a second set of packets via the subset of node devices based on a time condition related to a time condition being satisfied.

Referring now to FIG. 8, illustrated is a schematic system block diagram for determining a relay path based on a subset of node devices and sending a second set of packets via the subset of node devices based on a time condition related to a time condition being satisfied. At element 800 a system can facilitate, the determining of a relay path based on a subset of node devices, of a set of node devices, that have transmitted a first set of packets. An originator node can transmit packets that can be heard by other nodes during a geocast. A node whose transmission is heard first by other nodes is considered a relay node. The relay path is comprised of the subset of node devices at element 800.

The system can also facilitate, at element 802, caching of data representing the relay path of the first set of packets and selecting the relay path of the first set of packets based on the data representing the relay path of the first set of packets. Cached node identification data associated with each packet from the first set of packets allows the system to determine which nodes are relay nodes based on which nodes were heard first. Whenever the nodes hear a transmission, they can record statistics about the transmission in the geocast record corresponding to the geocast. The statistics can include a count of how many copies have been heard, the minimum distance of all senders from the node, and the minimum distance from a sender to the CGR. The node identification data also allows each node to determine the proper transmission path for a followcast based on the cached node identification data. An SAGP geocast record can include, but is not limited to, fields such as: MyRelay, IDidRelay, HHATMR, OriginIDToFollow, SNToFollow. These fields allow for records to be stored or cached. The stored or cached records can correspond to nodes and their identities. At element 802, the cached data can be representative of the relay path of the first set of packets. The identified relay paths can then be selected again at element 804 for a transmission, via the relay path, of a second set of packets at element 806.

Furthermore, at element 808 the system can facilitate the sending of the second set of packets in response to a time condition being determined to have been satisfied, and wherein the time condition is associated with a node device of the subset of node devices associated with a transmission of the second set of packets. Conditions relating to the node device transmissions can be based on heuristics. Heuristics can be based upon the recorded statistics in the geocast record, and nodes can retransmits if at least one such heuristic is satisfied. The M heuristic is true if fewer than M copies of the packet have been heard; the T heuristic is true if the minimum distance of all senders from this node is greater than T, the CD (center distance) heuristic is true if the minimum distance from any sender to the CGR is greater than the current distance from the node to the CGR. Retransmissions can proceed until all devices hearing at least one copy of the packet have made their decisions. However, geocasts also have an age limit, meaning that after L seconds beyond their origination time the geocast record can be purged and the geocast can no longer be retransmitted.

Figure 9:
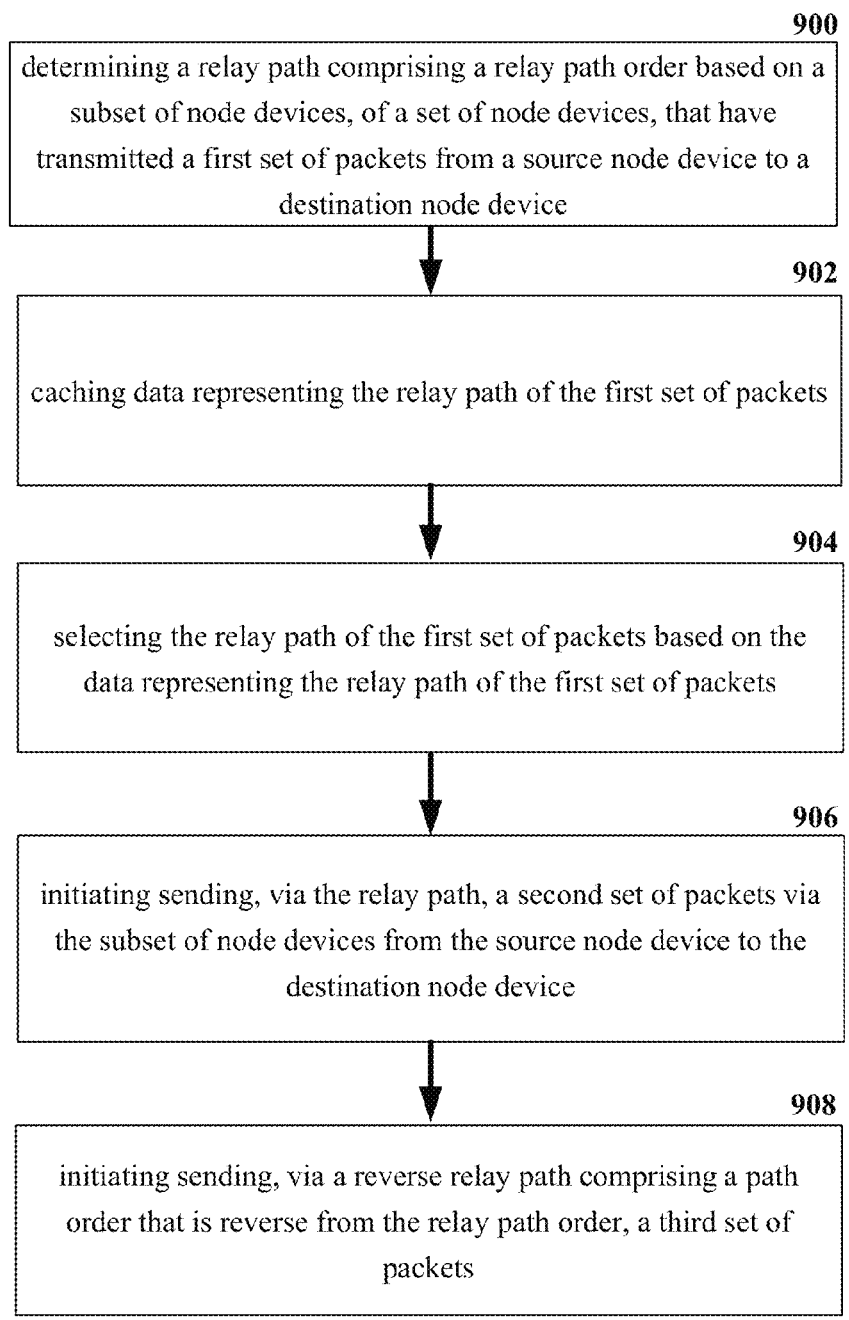
FIG. 9 illustrates a schematic system block diagram for determining a relay path based comprising a relay path order of a subset of node devices, sending a second set of packets via the subset of node devices, and sending a third set of packets via the subset of node devices in reverse order.

Referring now to FIG. 9, illustrated is a schematic system block diagram for determining a relay path based comprising a relay path order of a subset of node devices, sending a second set of packets via the subset of node devices, and sending a third set of packets via the subset of node devices in reverse order. At element 900, a relay path comprising a relay path order based on a subset of node devices, of a set of node devices, that have transmitted a first set of packets from a source node device to a destination node device. An originator node can transmit packets that can be heard by other nodes during a geocast. A node whose transmission is heard first by other nodes is considered a relay node, wherein there can be a relay path order based on the subset of relay node devices.

At element 902, the operations comprising caching data representing the relay path of the first set of packets and selecting, at element 904, the relay path of the first set of packets based on the data representing the relay path of the first set of packets. Cached node identification data associated with each packet from the first set of packets allows the system to determine which nodes are relay nodes based on which nodes were heard first. Whenever the nodes hear a transmission, they can record statistics about the transmission in the geocast record corresponding to the geocast. The statistics can include a count of how many copies have been heard, the minimum distance of all senders from the node, and the minimum distance from a sender to the CGR. The node identification data also allows each node to determine the proper transmission path for a followcast based on the cached node identification data. An SAGP geocast record can include, but is not limited to, fields such as: MyRelay, IDidRelay, HHATMR, OriginIDToFollow, SNToFollow. These fields allow for records to be stored or cached. The stored or cached records can correspond to nodes and their identities. At element 902, the cached data can be representative of the relay path of the first set of packets. The identified relay paths can then be selected again at element 904 for a transmission at element 906. At element 906 the operations can comprise initiating sending, via the relay path, a second set of packets via the subset of node devices from the source node device to the destination node device.

At element 908, the computer readable medium can initiate sending, via a reverse relay path comprising a path order that is reverse from the relay path order, a third set of packets. A recipient node of the original geocast can send a followcast that traverses the path in reverse to reach the originator of the geocast. This provides an efficient way to reply to a geocast query by using fewer transmissions than geocasting.

Figure 10:
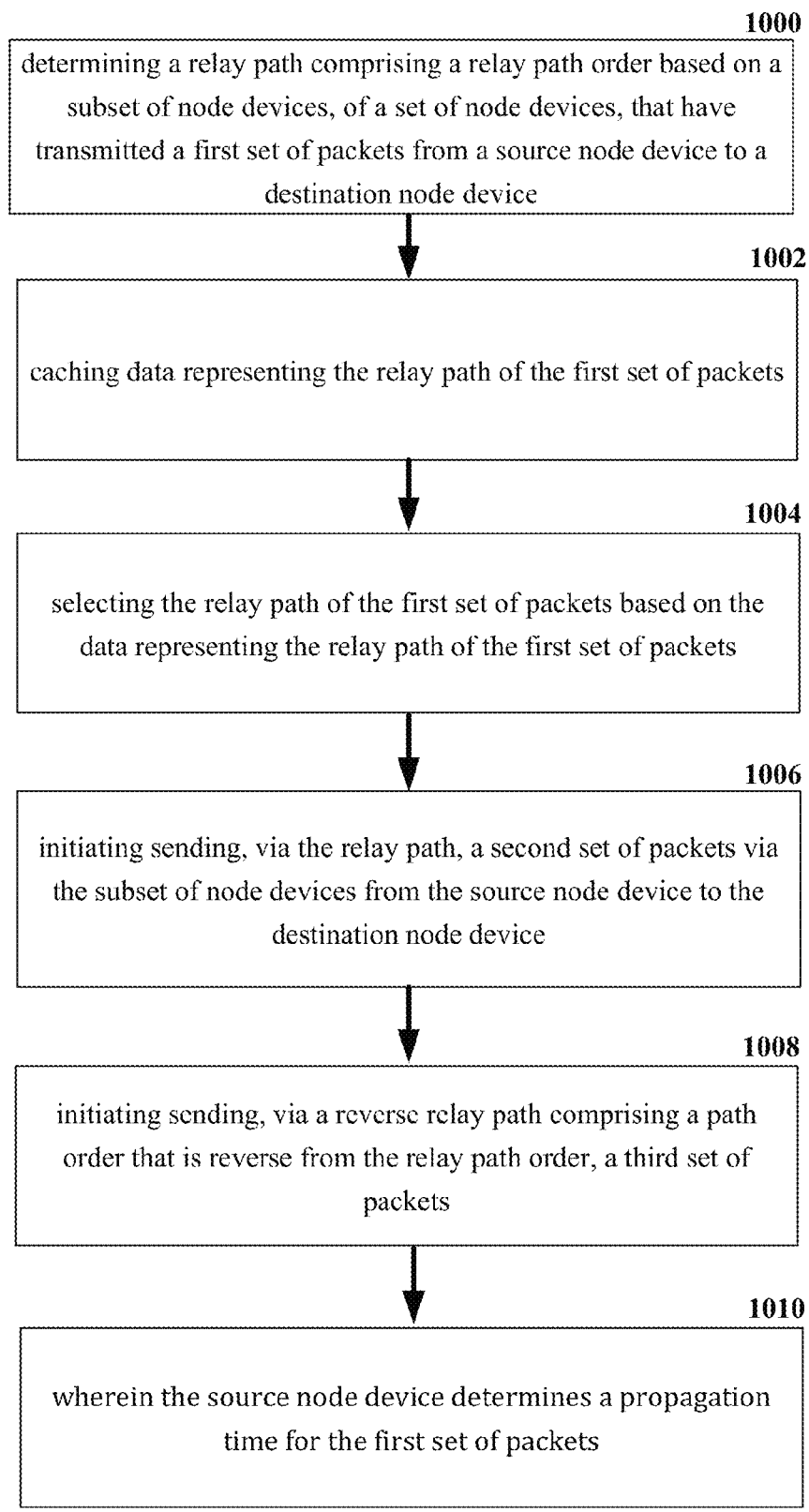
FIG. 10 illustrates a schematic system block diagram for determining a relay path based comprising a relay path order of a subset of node devices, sending a second set of packets via the subset of node devices, and sending a third set of packets via the subset of node devices in reverse order, wherein a source node determines a propagation time.

Referring now to FIG. 10, illustrated a schematic system block diagram for determining a relay path based comprising a relay path order of a subset of node devices, sending a second set of packets via the subset of node devices, and sending a third set of packets via the subset of node devices in reverse order, wherein a source node determines a propagation time. At element 1000, a relay path comprising a relay path order based on a subset of node devices, of a set of node devices, that have transmitted a first set of packets from a source node device to a destination node device. An originator node can transmit packets that can be heard by other nodes during a geocast. A node whose transmission is heard first by other nodes is considered a relay node, wherein there can be a relay path order based on the subset of relay node devices.

At element 1002, the operations comprising caching data representing the relay path of the first set of packets and selecting, at element 1004, the relay path of the first set of packets based on the data representing the relay path of the first set of packets. Cached node identification data associated with each packet from the first set of packets allows the system to determine which nodes are relay nodes based on which nodes were heard first. Whenever the nodes hear a transmission, they can record statistics about the transmission in the geocast record corresponding to the geocast. The statistics can include a count of how many copies have been heard, the minimum distance of all senders from the node, and the minimum distance from a sender to the CGR. The node identification data also allows each node to determine the proper transmission path for a followcast based on the cached node identification data. An SAGP geocast record can include, but is not limited to, fields such as: MyRelay, IDidRelay, HHATMR, OriginIDToFollow, SNToFollow. These fields allow for records to be stored or cached. The stored or cached records can correspond to nodes and their identities. At element 1002, the cached data can be representative of the relay path of the first set of packets. The identified relay paths can then be selected again at element 1004 for a transmission at element 1006. At element 1006 the operations can comprise initiating sending, via the relay path, a second set of packets via the subset of node devices from the source node device to the destination node device.

At element 1008, the computer readable medium can initiate sending, via a reverse relay path comprising a path order that is reverse from the relay path order, a third set of packets. A recipient node of the original geocast can send a followcast that traverses the path in reverse to reach the originator of the geocast. This provides an efficient way to reply to a geocast query by using fewer transmissions than geocasting. Furthermore, the computer readable medium can perform operations comprising the source node device determining a propagation time for the first set of packets at element 1010. Whenever the source node's geocast layer receives a copy of one of its packets sent by another, it can determine the time difference between the arrival of the copy and the origination time of the packet. When this exceeds a threshold, the application layer can be notified and can pause or slow the rate of injecting new stream chunks.

Figure 11:
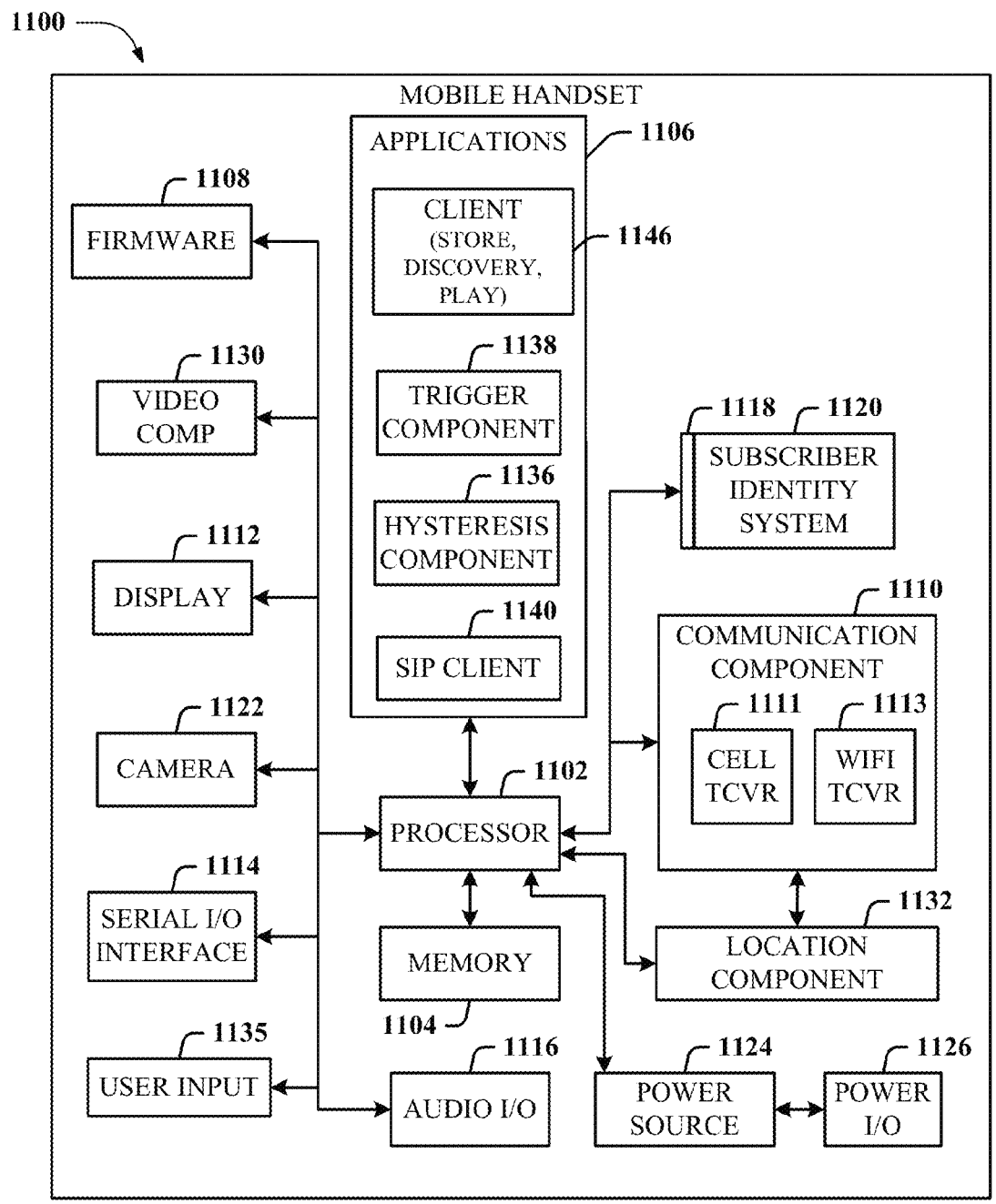
FIG. 11 illustrates a block diagram of an example mobile handset operable to engage in a system architecture that facilitates secure wireless communication according to the embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the innovation described herein. The following discussion is intended to provide a brief, general description of an example of a suitable environment 1100 in which the various embodiments can be implemented. While the description includes a general context of computer-executable instructions embodied on a computer readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of computer-readable media. Computer readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., WiFi, WiMax) for corresponding signal communications.

The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
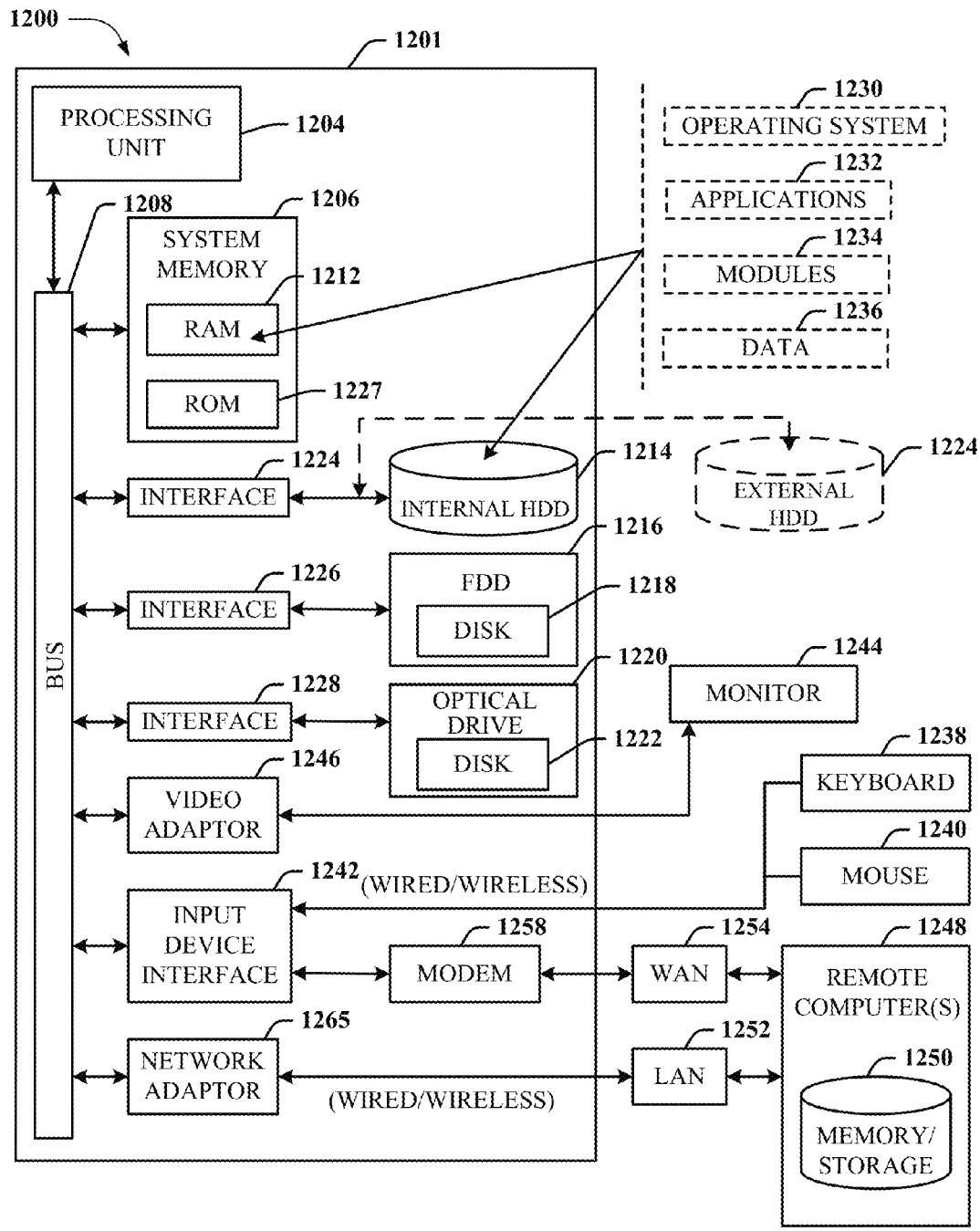
FIG. 12 illustrates a block diagram of an example computer operable to engage in a system architecture that facilitates secure wireless communication according to the embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1211 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the serial port interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:
1. A method, comprising:
  determining, by a network device comprising a processor, that the network device is one of first node devices, of node devices, that have transmitted a first packet via the first node devices, resulting in a first packet transmission;
  caching, by the network device, data representing the first node devices;
  in response to the caching and the determining that the first packet transmission was received by a second node device of the node devices, categorizing, by the network device, the network device as a relay node device;

determining, by the network device, to transmit a second packet, based on the data representing the first node devices; and in response to a condition being determined to have been satisfied, transmitting, by the network device, the second packet, resulting in a second packet transmission, wherein the condition is related to a selection of the first node devices for the transmitting the second packet based on the second node device receiving the first packet transmission from the network device before the second node device receives the first packet transmission from a third node device of the first node devices and the categorizing the network device as the relay node device.

2. The method of claim 1, wherein the first packet comprises node identification data of a first node device that has previously transmitted a third data packet to second node devices of the node devices.

3. The method of claim 1, wherein the condition is a first condition, and wherein a node device of the first node devices transmits a third packet in response to a second condition being determined to have been satisfied.

4. The method of claim 1, wherein a first packet header associated with the second packet comprises additional fields other than that of a second packet header associated with the first packet.

5. The method of claim 4, wherein the additional fields comprise node identification data and a serial number associated with the first node devices that have transmitted the first packet.

6. The method of claim 5, wherein a node device of the first node devices verifies the node identification data and the serial number associated with the first node devices during the transmitting the second packet.

7. The method of claim 6, wherein the condition is a first condition, and wherein the second packet is transmitted in response to a second condition being determined to have been satisfied.

8. A system, comprising:
a processor; and
a memory that stores executable instructions that, when executed by the processor, facilitate performance of operations, comprising:
determining whether a network device is associated with first node devices of node devices that have transmitted a first packet via the first node devices, resulting in a first transmission;
in response to the first transmission, caching data representing the first node devices;
determining that a first node device of the first node devices received the first transmission from the network device before the first node device received the first transmission from a second node device that is not the network device;
in response to the caching and the determining that the first node device received the first transmission from the network device before the first node device received the first transmission from a second node device, labeling the network device as a relay node device;
based on the data representing the first node devices and the labeling of the network device as the relay node device, selecting the network device to transmit a second packet during a second transmission; and in response to a condition related to a selection of the first node devices being determined to have been satisfied, transmitting the second packet via the first node devices.

9. The system of claim 8, wherein the transmitting the second packet is in response to a time condition being determined to have been satisfied.

10. The system of claim 9, wherein the time condition is a first time condition, and wherein the transmitting the second packet has been aborted and a second time condition is allocated to the network device in response to the first time condition being determined to have not been satisfied.

11. The system of claim 8, wherein the sending of the second packet is in response to a time condition being determined to have been satisfied, and wherein the time condition is associated with a transmission of the first packet.

12. The system of claim 8, wherein a first packet header associated with the second packet comprises additional fields other than a second packet header associated with the first packet.

13. The system of claim 12, wherein the additional fields comprise identification data associated with the node devices that have transmitted the second packet.

14. The system of claim 12, wherein the additional fields comprise a serial number associated with the first node devices that have retransmitted the second packet.

15. A non-transitory machine-readable storage medium, comprising executable instructions that, when executed by a processor, facilitate performance of operations, comprising:
determining that a network device is related to first node devices of node devices that have participated in a transmission of a first packet via the first node devices;
determining that a first node device of the first node devices has received the first packet from the network device prior to receiving the first packet from the node devices that are not the network device;
facilitating a caching of data identifying the first node devices;
in response to the determining that the first node device of the first node devices has received the first packet and in response to the caching, identifying the network device as a relay node device;
based on the data identifying the first node devices, determining whether to transmit a second packet; and
in response to a condition being determined to have been satisfied, transmitting the second packet via the first node devices, wherein the condition is related to a selection of the first node devices for the transmitting of the second packet and the identifying the network device as the relay node device.

16. The non-transitory machine-readable storage medium of claim 15, wherein the network device determines a propagation time for the first packet.

17. The non-transitory machine-readable storage medium of claim 15, wherein the network device partitions packets into packet chunks and assigns identification data to the packet chunks.

18. The non-transitory machine-readable storage medium of claim 17, wherein a destination node device requests a retransmission of missing packet chunk data based on the identification data indicating that there is a missing packet chunk.

19. The non-transitory machine-readable storage medium of claim 17, wherein the network device waits for a time period before sending the packet chunks.

20. The non-transitory machine-readable storage medium of claim 15, wherein the first node device, of the first node devices, verifies identification data associated with the first node devices during a selection of a relay path for the first packet.

* * * * *